US009298748B2

(12) United States Patent
Yun et al.

(10) Patent No.: US 9,298,748 B2
(45) Date of Patent: Mar. 29, 2016

(54) APPARATUS AND METHOD PROVIDING CONTENT SERVICE

(75) Inventors: Hee-chul Yun, Suwon-si (KR); Yoon-hark Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 757 days.

(21) Appl. No.: 11/687,833

(22) Filed: Mar. 19, 2007

(65) Prior Publication Data

US 2008/0091688 A1 Apr. 17, 2008

(30) Foreign Application Priority Data

Oct. 17, 2006 (KR) .............................. 2006-101031

(51) Int. Cl.
*G06F 7/00* (2006.01)
*G06F 17/30* (2006.01)
(52) U.S. Cl.
CPC .... *G06F 17/30289* (2013.01); *G06F 17/30575* (2013.01); *G06F 17/30578* (2013.01)
(58) Field of Classification Search
CPC ..................... G06F 17/30575; G06F 17/30578
USPC ............. 707/1, 620, 621, 623, 628, 630, 631, 707/613, 622, 632
See application file for complete search history.

(56) References Cited

U.S. PATENT DOCUMENTS

| | | | |
|---|---|---|---|
| 8,644,702 B1* | 2/2014 | Kalajan ........................... | 396/429 |
| 2001/0051979 A1* | 12/2001 | Aufricht et al. ................ | 709/203 |
| 2002/0046353 A1* | 4/2002 | Kishimoto ..................... | 713/202 |
| 2002/0087543 A1* | 7/2002 | Saitou et al. ...................... | 707/9 |
| 2002/0156762 A1* | 10/2002 | Chu ................................... | 707/1 |
| 2002/0174175 A1* | 11/2002 | Zhu et al. ........................ | 709/203 |
| 2003/0001887 A1* | 1/2003 | Smith, IV ...................... | 345/741 |
| 2004/0044677 A1* | 3/2004 | Huper-Graff et al. ......... | 707/102 |
| 2004/0117306 A1* | 6/2004 | Karaoguz et al. ............... | 705/40 |
| 2004/0224638 A1 | 11/2004 | Fadell et al. | |
| 2005/0065851 A1* | 3/2005 | Aronoff et al. ................. | 705/15 |
| 2005/0114534 A1* | 5/2005 | Lee ................................. | 709/230 |
| 2005/0119913 A1* | 6/2005 | Hornreich et al. ............... | 705/2 |
| 2005/0188403 A1* | 8/2005 | Kotzin ........................... | 725/47 |

(Continued)

FOREIGN PATENT DOCUMENTS

| | | |
|---|---|---|
| KR | 2002-61927 | 7/2002 |
| KR | 2002-74004 | 9/2002 |
| KR | 2006-722 | 1/2006 |

OTHER PUBLICATIONS

Korean Office Action dated Nov. 23, 2007 of the Korean Patent Application No. 2006-101031.

*Primary Examiner* — Mark E Hershley
(74) *Attorney, Agent, or Firm* — Jefferson IP Law, LLP

(57) ABSTRACT

A method and apparatus for providing contents services. The method of using a contents service includes the operations of receiving a list of available contents services from a first server and displaying the list, transmitting, to the first server, a list of contents services selected from the displayed available contents service list, and updating service subscription data with reference to the selected contents service list. Accordingly, the subscription of contents services, such as a channel service that provides each user with different information according to subscription information, can be managed at any time and at any place without being dependent on a specific PC or a specific PC program. Even while moving without being connected with a PC, a mobile device can automatically update its contents.

11 Claims, 6 Drawing Sheets

(56) References Cited

U.S. PATENT DOCUMENTS

| | | |
|---|---|---|
| 2006/0008256 A1* | 1/2006 | Khedouri et al. ............. 386/124 |
| 2006/0064458 A1* | 3/2006 | Gehrmann ................... 709/203 |
| 2006/0095339 A1 | 5/2006 | Hayashi et al. |
| 2006/0159048 A1* | 7/2006 | Han et al. ..................... 370/331 |
| 2006/0161554 A1* | 7/2006 | Lucovsky et al. .............. 707/10 |
| 2006/0190413 A1* | 8/2006 | Harper ............................ 705/65 |
| 2006/0205395 A1* | 9/2006 | Barone et al. ................ 455/420 |
| 2006/0217126 A1* | 9/2006 | Sohm et al. .................. 455/454 |
| 2006/0224742 A1* | 10/2006 | Shahbazi ...................... 709/226 |
| 2006/0265409 A1* | 11/2006 | Neumann et al. ............. 707/100 |
| 2006/0277481 A1* | 12/2006 | Forstall et al. ................ 715/764 |
| 2007/0010195 A1* | 1/2007 | Brown et al. ................ 455/3.06 |
| 2007/0077921 A1* | 4/2007 | Hayashi et al. ............ 455/414.1 |
| 2007/0083520 A1* | 4/2007 | Shellen et al. ................. 707/10 |
| 2007/0088832 A1* | 4/2007 | Tsang et al. .................. 709/227 |
| 2007/0118853 A1* | 5/2007 | Kreitzer et al. .................. 725/46 |
| 2007/0198698 A1* | 8/2007 | Boyd et al. ................... 709/224 |
| 2007/0225047 A1* | 9/2007 | Bakos ........................... 455/566 |
| 2007/0240030 A1* | 10/2007 | Cronstrom ................. 715/500.1 |
| 2007/0258584 A1* | 11/2007 | Brown et al. .................... 380/43 |
| 2007/0266414 A1* | 11/2007 | Kahn et al. .................... 725/113 |
| 2007/0293275 A1* | 12/2007 | Kalinichenko et al. ....... 455/567 |
| 2007/0299913 A1* | 12/2007 | Griffin .......................... 709/205 |
| 2007/0299978 A1* | 12/2007 | Neumann et al. ............. 709/229 |
| 2008/0010487 A1* | 1/2008 | Dekel et al. ...................... 714/4 |
| 2008/0027996 A1* | 1/2008 | Morris .......................... 707/200 |
| 2008/0065741 A1* | 3/2008 | Stratton et al. ............... 709/217 |
| 2008/0071839 A1* | 3/2008 | Sattler et al. ................. 707/200 |
| 2008/0205647 A1* | 8/2008 | Zhang et al. .................. 380/258 |
| 2008/0317036 A1* | 12/2008 | Chandrasiri et al. ....... 370/395.3 |

\* cited by examiner

APPARATUS AND METHOD PROVIDING CONTENT SERVICE

CROSS-REFERENCE TO RELATED APPLICATIONS

This application claims the benefit of Korean Patent Application No. 2006-101031, filed on Oct. 17, 2006 in the Korean Intellectual Property Office, the disclosure of which is incorporated herein in its entirety by reference.

BACKGROUND OF THE INVENTION

1. Field of the Invention

Aspects of the present invention relate to the provision of content services, and more particularly, to a method and apparatus for using content services in personal computers (PCs) or mobile devices, and a method and apparatus for providing content services.

2. Description of the Related Art

Online content distribution services based on a rich syndication system (RSS, also referred to as Really Simple Syndication), such as podcasting, allow users to subscribe to their own desired channels and then automatically receive content (e.g., pictures, music, moving pictures, and news) without needing to visit a site every time. Hence, online content distribution services enable users to obtain content easily from a plurality of information providers at one time. Personal computers (PCs) are generally used to subscribe to a channel and to download content provided by the channel using a dedicated program, since PCs can access networks easily, can provide a high-level user interface (UI), and are convenient for channel searching, subscriptions, and content download.

However, since PCs are not easily portable, content downloaded to PCs are often re-downloaded to a mobile device, such as a portable media player, so that the content can be played on the move by the mobile device. Although mobile devices are not able to access a network in many cases and generally do not have a convenient UI, channel content downloaded to PCs are usually re-downloaded to mobile devices via a universal serial bus (USB) because of the good portability of the mobile devices.

FIG. 1 is a block diagram of a conventional channel service system. A user manages a channel subscription list using a PC 120 and downloads new content from subscribed channels via corresponding channel servers 130. The user stores the downloaded content in a mobile deice 110 and enjoys the content through the mobile device 110. The channel subscription list includes access information about the channel servers 130, which are content providing servers, and is stored in the PC 120 of each user. Hence, when the user has no PC 120, the user is unable to update the content in the mobile device 110.

In other words, when re-downloading content from a PC to a portable media player, information about the channel subscription of a user and content is dependent on a specific application program of the PC. Thus, when using this method, the user cannot update content when using another PC or a mobile device.

SUMMARY OF THE INVENTION

Aspects of the present invention provide a method and apparatus for providing content services, by which a user can be provided with the latest contents even on the move without being dependent on a specific PC or application program.

According to an aspect of the present invention, there is provided a method of using a content service, comprising receiving a list of available content services from a first server and displaying the list; transmitting, to the first server, a list of content services selected from the displayed available content service list; and updating service subscription data with reference to the selected content service list.

According to another aspect of the present invention, the method may further include receiving from the first server a list of content services to which a user subscribes; and updating the service subscription data with reference to the received subscribed content service list.

According to another aspect of the present invention, the method may further include connecting to at least one second server with reference to the service subscription data and receiving content from the at least one second server based on the service subscription data.

According to another aspect of the present invention, there is provided a method of using a content service comprising connecting to a first server when a connection of a second device desiring access to the content service is detected, and transmitting, to the first server, a registration request including information about the second device.

According to another aspect of the present invention, the method may further include receiving from the first server a list of content services to which a user subscribes; updating service subscription data with reference to the received subscribed content service list; and transmitting the received subscribed content service list to the second device.

According to another aspect of the present invention, there is provided a method of using a content service comprising transmitting, to a first server, a request for information about a subscribed content service list, receiving the subscribed content service list from the first server, and updating service subscription data with reference to the received subscribed content service list.

According to another aspect of the present invention, the method may further include connecting to at least one second server with reference to the service subscription data and receiving content from the at least one second server.

According to another aspect of the present invention, transmitting the information request to the first server may include transmitting, to the first server, predetermined device identification information or predetermined user identification information in order to perform authentication.

According to another aspect of the present invention, there is provided a method of using a content service comprising: receiving, from a first device, a registration request including identification information about a second device; determining whether the second device has been registered by referring to the received identification information; and registering the second device if the second device has not yet been registered.

According to another aspect of the present invention, registering the second device may include the correlating the identification information about the second device with user information about the first device and storing the correlated identification information.

According to another aspect of the present invention, the method may further include receiving, from the second device, a request for subscription information including the identification information about the second device; and searching for a list of subscribed content services corresponding to the second device and transmitting the list to the second device.

According to another aspect of the present invention, the method may further include transmitting a list of available content services to the first device; and updating a list of subscribed content services associated with a user of the first device, when a request for subscribing to at least one content service is received from the first device.

According to another aspect of the present invention, the method may further include receiving, from the first device, a request for subscription information including user information and searching for a list of subscribed content services corresponding to the user and transmitting the list to the first device.

According to another aspect of the present invention, there is provided an apparatus to use a contents service the apparatus comprising a storage unit to store service subscription data; and a control unit to receive a list of available content services from a first server via a communication unit, to output the available content service list to a display unit, to transmit a list of content services selected from the displayed contents service list to the first server, and to update the service subscription data of the storage unit with reference to the selected content service list.

According to another aspect of the present invention, there is provided an apparatus to use a content service, the apparatus comprising a storage unit to store service subscription data; and a control unit to transmit a registration request including information about a second device to a first server via a second communication unit when a connection of the second device via a first communication unit is detected; to receive from the first server a list of content services to which a user has subscribed, and to update the service subscription data of the storage unit.

According to another aspect of the present invention, there is provided an apparatus to use a content service, the apparatus comprising a storage unit to store service subscription data; a communication unit to perform wireless communication, and a control unit to transmit a request for information about a subscribed content service list to a first server via the communication unit and to update the service subscription data of the storage unit with reference to the subscribed contents service list received from the first server.

According to another aspect of the present invention, there is provided an apparatus to provide a catalog service, the apparatus comprising a storage unit to store information about available content services, user account data, and a subscribed content service list for each user; and a control unit to correlate identification information about a second device with the user account data of the storage unit and to store the correlated identification information about the second device in order to register the second device, when receiving a registration request including the identification information about the second device from the first device via a first communication unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
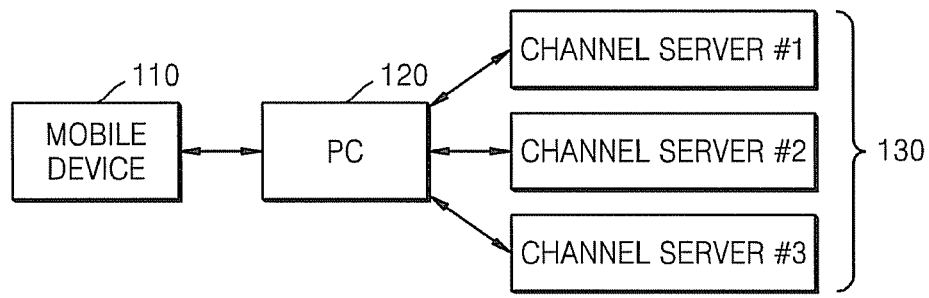
FIG. 1 is a block diagram of a conventional channel service system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
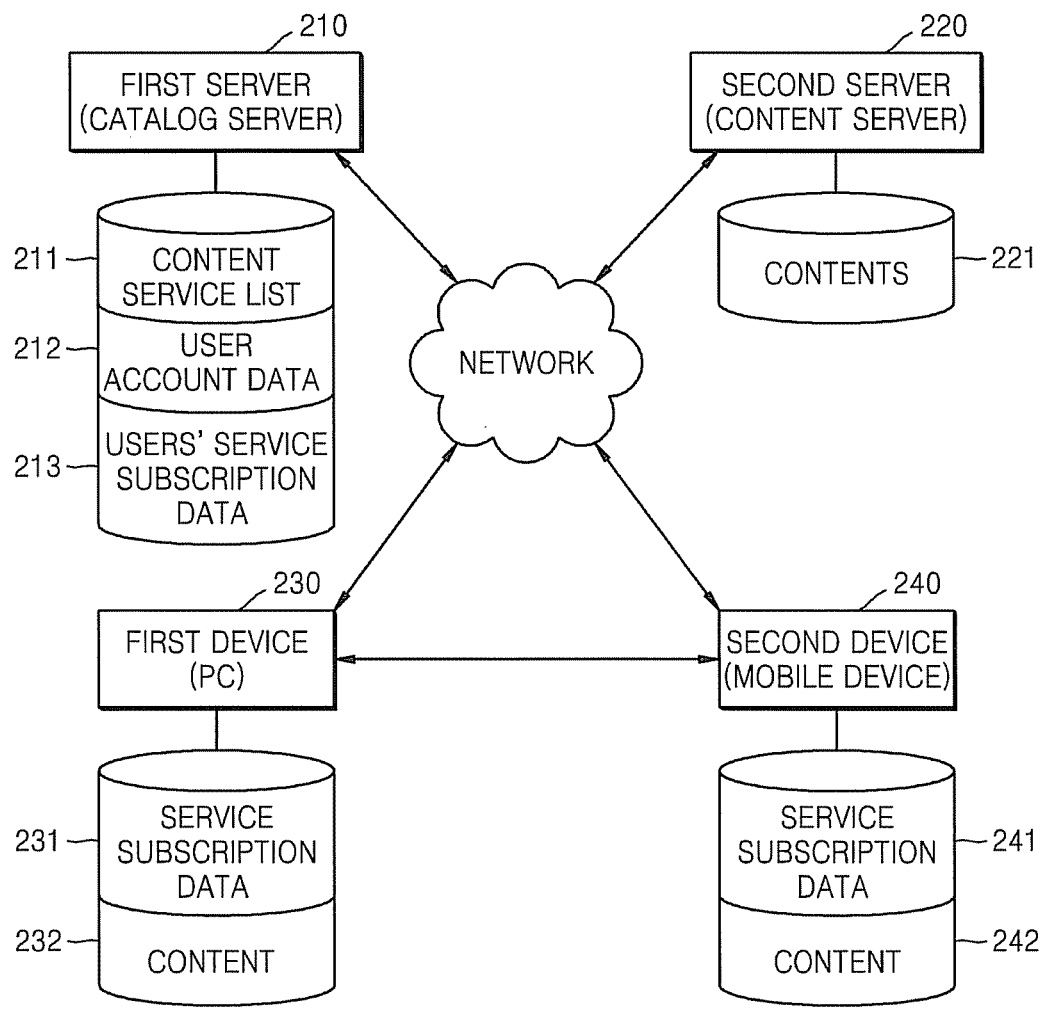
FIG. 2 is a block diagram of a contents service providing system according to an embodiment of the present invention.

FIG. 2 is a block diagram of a content service providing system according to an embodiment of the present invention. The content service providing system includes a first server 210, at least one second server 220, a first device 230, and a second device 240. The first and second devices 230 and 240 are user devices. Each of these servers and devices is a computing system including a storage unit, a control unit, and a communications unit.

The first server 210 is a catalog service providing server and stores and manages a content service list 211, user account data 212, and users' service subscription data 213. The content service list 211 includes the content services provided by the second server 220. The second server 220 is a content providing server. The users' service subscription data 213 includes a list of content services to which each user has subscribed. When the content service providing system of FIG. 2 is applied to a channel service, the first server 210 serves as a channel portal that sorts scattered channel provider lists, provides the sorted channel provider lists to users, and stores and manages a list of channels to which each user has subscribed. The first server 210 may also serve as an online media store.

The user account data 212 may include identification information about a user and information about one or more of the user's devices. The user identification information is used by the first server 210 to authenticate a user and to handle inquiries or updates (addition or deletion) of service subscription data by the first device 230. The device information is used by the first server 210 for authentication upon receipt of a service subscription data request from the second device 240. Information about a plurality of devices for a user may be stored and managed. For example, if a user has several mobile devices, all of the user's mobile devices may be registered with the first server 210. Accordingly, even without the use of a specific PC, service subscription data or content for each mobile device is maintained consistently, or the other service subscription data are maintained for each mobile device, so that each mobile device can be provided with different content services.

The second server 220 provides at least one content service to the first and second devices 230 and 240 and stores a content list and content 221. When the content service providing system of FIG. 2 is applied to a channel service, the second server 220, as a channel server providing contents using a standard method, such as a rich syndication system (RSS, also known as Really Simple Syndication,) provides a channel list in a standardized format. The channel list may include link information from which actual content can be obtained.

The first device 230 may be a user device, such as a PC, and is connected to the first server 210 to receive a list of available content services so that a user can browse the available content services. When the user selects a desired content service, the first device 230 transmits a subscription request for the desired content service to the first server 210 and updates the service subscription data 231 stored in a local storage unit. The service subscription data 231 includes information about access to at least one content service to which a user has subscribed. The first server 210 updates the service subscription data corresponding to the user from the users' service subscription data 213 according to the received subscribing request. The first device 230 is connected to the second server 220 to provide content services to which the user has subscribed using the service subscription data 231 stored in the local storage unit and to receive content desired by the user or new contents from the second servers 220.

When the content service providing system of FIG. 2 is applied to a channel service, a program in the first device 230 performs user authentication through communication with the first server 210 and downloads a subscribed channel list for the user, which can be obtained from the service subscription data 213 stored in the first server 210. The user authentication may be performed using a user ID and/or a user password stored in the user account data 212 of the first server 210. When a user chooses to subscribe to a new channel after browsing a list of channels provided by the first server 210, the user's service subscription data 213 of the first server 210 and the service subscription data 231 of the first device 230 are both updated. In this way, the first server 210 has the latest subscribed channel list. Thus, a subscribed channel list that is common to all PCs instead of dependent on a specific PC can be obtained.

The second device 240 is a user device having different characteristics from the first device 230 and is a media player (e.g., an MP3 or video player) having a networking function. The second device 240 may be a mobile device including a first communication unit to enable access to the first and second servers 210 and 220 via a wireless network and a second communication unit to enable access to the first device 230. The first communication unit may be capable of accessing the Internet wirelessly; the second communication unit may use, but is not limited to, a USB (Universal Serial Bus). According to other aspects of the invention, the media player/mobile device may connect to the first and second servers 210 and 220 and the first device 230 using the same communication unit. The second device 240 stores service subscription data 241 in a local storage unit and downloads content 242 using the service subscription data 241 after contacting the second server 220. The second device 240 may also download the service subscription data 231 and the content 232 from the first device 230 so as to update the data of the local storage unit with the latest data.

When the second device 240 is connected to the first device 230, the first device 230 transmits the identification information about the second device 240 to the first server 210 to register the second device 240 with the first server 210. The identification information about the second device 240 may be device information or user information. The first server 210 manages the user account data 212 by correlating the user identification information about the first device 230 with the identification information about the second device 240 and storing and managing the correlated user identification information. When the registration of the second device 240 is completed, the user of the second device 240 is able to use content services without manual authentication or intervention by a specific PC. For example, the second device 240 can synchronize the service subscription data 241 in the local storage unit with the latest service subscription data after transmitting a device identifier to the first server 210 and obtaining the latest service subscription data. The second device 240 can access the second server 220 with reference to the service subscription data 241 of the local storage unit and can synchronize the content 242 of the local storage unit with the latest content received from the second server 220.

Figure 3:
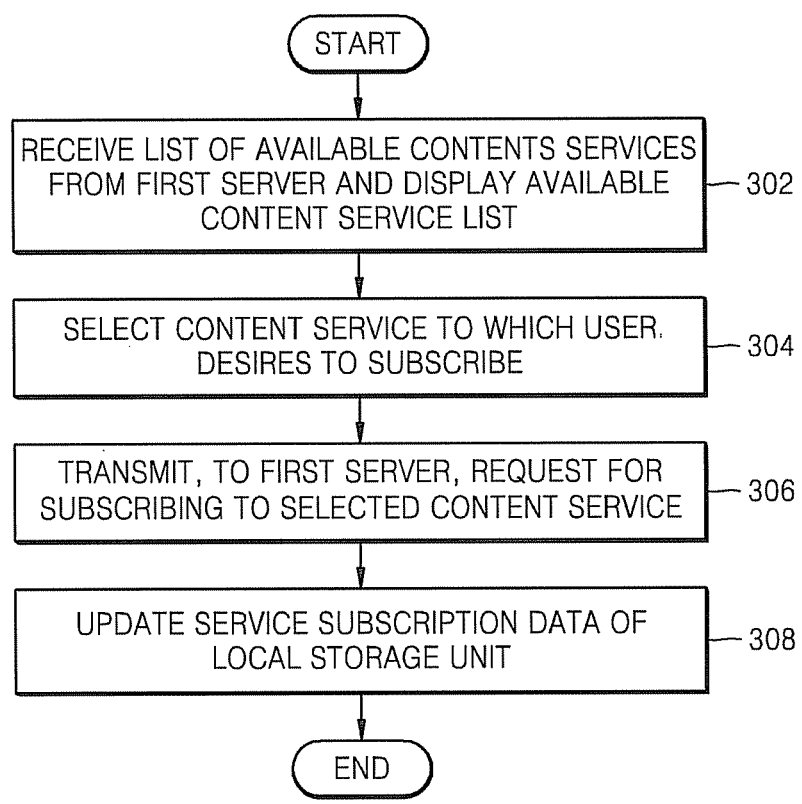
FIG. 3 is a flowchart illustrating a method for a first device to subscribe to a contents service, according to an embodiment of the present invention.

FIG. 3 is a flowchart illustrating a technique for the first device 230 to subscribe to a content service according to an embodiment of the present invention. First, in operation 302, a control unit of the first device 230 receives a list of available content services from the first server 210 and displays the list so that a user can browse the available content services. When the user logs into the first server 210 and selects at least one desired content service from the displayed content service list in operation 304, the control unit of the first device 230 transmits to the first server 210 a request to subscribe to the selected contents service, operation 306. This process is similarly applied when a user withdraws from a subscribed content service. In that situation, the user transmits to the server 210 a request to withdraw from content services that are withdrawn by the user on a screen on which a list of subscribed content services is displayed. The first server 210 receives the user's subscription or withdrawal request and updates the user's subscribed content service list from the users' service subscription data 213. The first device 230 updates the service subscription data 231 of the local storage unit according to a selection by the user in operation 308. Whenever the first device 230 logs into or contacts the first server 210, the first server 210 transmits to the first device 230 a list of content services to which the user has subscribed. Even when the subscribed contents service list is changed by another user device, the first device 230 can keep the service subscription data 231 updated using the received data.

Figure 4:
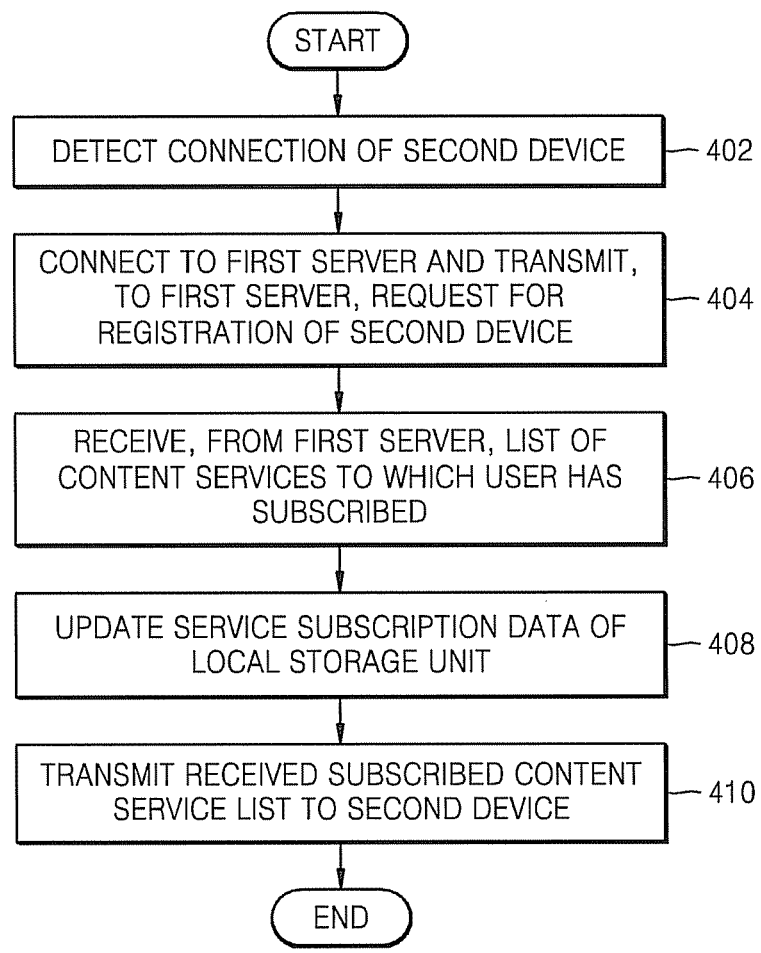
FIG. 4 is a flowchart illustrating a method for a first device to process the registration of a second device, according to an embodiment of the present invention.

FIG. 4 is a flowchart illustrating a technique for the first device 230 to process the registration of the second device 240, according to an embodiment of the present invention. In operation 402, when the first device 230 detects that the second device 240 is connected to the first device 230 in order to use content services, the first device 230 contacts and logs into the first server 210. Next, in operation 404, the first device 230 transmits to the first server 210 a registration request including information about the second device 240. The first server 210 processes the log-in operation of the first device 230, performs authentication, correlates the received information about the second device 240 with information about a logged-in user, and registers the correlated information about the second device 240.

Operations 406 and 408 illustrate a process of updating the service subscription data 231 on the first device 230, apart from the process of registering the second device 240. The updating process may be executed before or after the registering process. The first device 230 receives from the first server 210 a list of content services to which a user has subscribed, in operation 406. Then, in operation 408, the first device 230 synchronizes the service subscription data 231 of the local storage unit with the latest data using the received list. Additionally, in operation 410, the first device 230 may transmit the list received from the first server 210 to the currently-connected second device 240 in order to synchronize the service subscription data 241 stored in the second device 240 with the latest data. The first device 230 may transmit user information, such as a user ID and/or a user password, to the second device 240 so that the user information is stored in the second device 240. In this case, when the second device 240 is connected to the first server 210, the second device 240 is authenticated using the user information.

Figure 5:
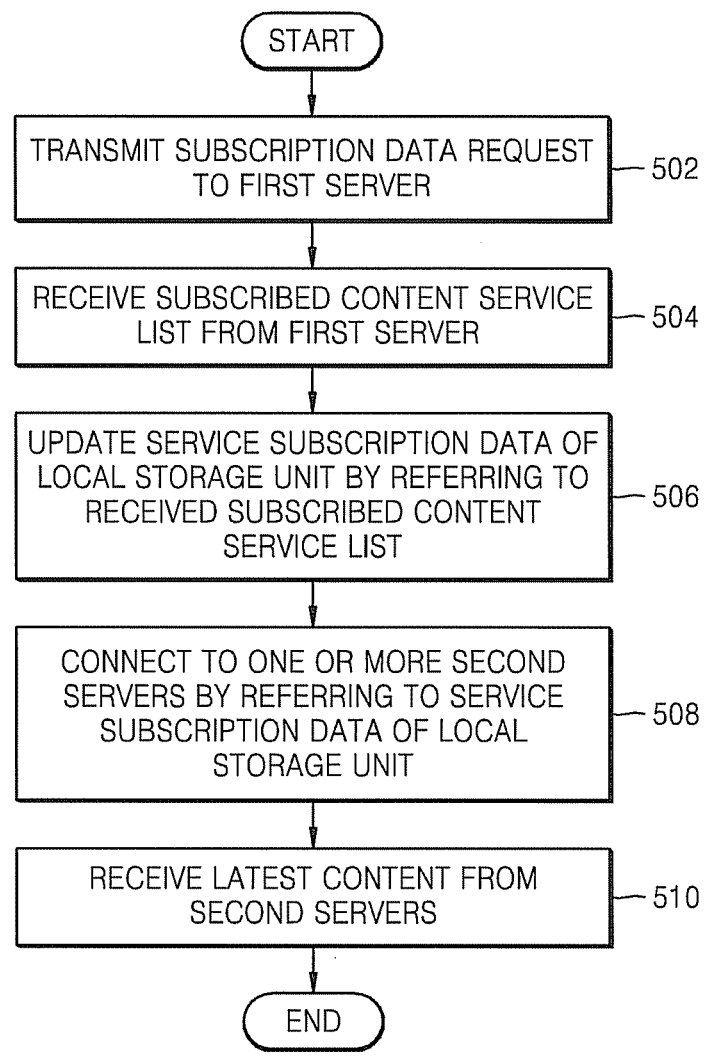
FIG. 5 is a flowchart illustrating a method for a second device to use a contents service, according to an embodiment of the present invention.

FIG. 5 is a flowchart illustrating a technique for the second device 240 to use a content service according to an embodiment of the present invention. Operations 502 through 506 are used to update the service subscription data 241 with the latest data. In operation 502, the second device 240 registered in the first server 210 transmits a subscription data request to the first server 210. The subscription data request may include ID information, such as device information or user information. In operation 504, the second device 240 receives a subscribed content service list corresponding to the ID information from the first server 210 in response to the request. In operation 506, the second device 240 updates the service subscription data 241 of the local storage unit using the received subscribed content service list.

Operations 508 and 510 are used to update the content 242 with the latest data. In operation 508, the second device 240 is connected to the second server 220 using the service subscription data 241 of the local storage unit. In operation 510, the second device 240 receives the latest content. To receive the latest content, the second device 240 requests and receives a content list from the second server 220 and can then request and download desired content using the content list. However, a content receiving technique according to aspects of the present invention is not limited to this technique and may vary according to the type of content service to which aspects of the present invention are applied. For example, if the present invention is applied to a channel service, the second device 240 may connect to a channel server indicated by the service subscription data 241 and may receive the latest updated content from the channel server.

Figure 6:
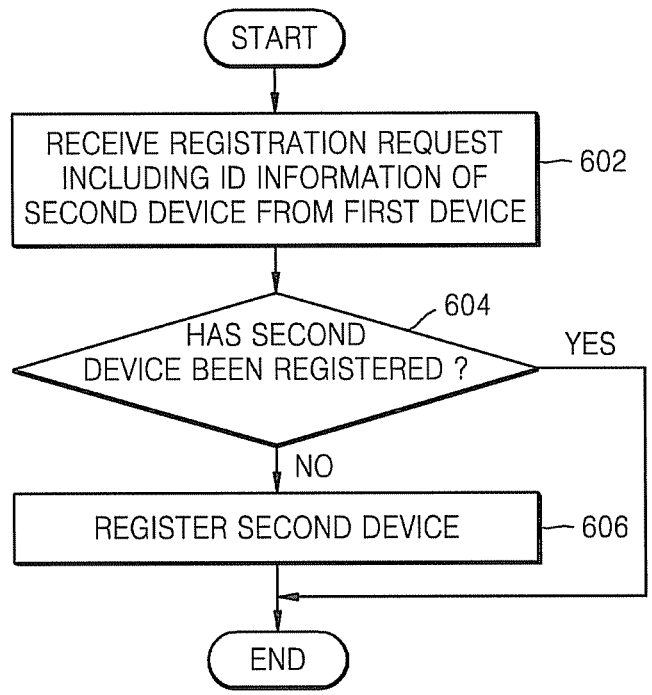
FIG. 6 is a flowchart illustrating a method for a first server to process the registration of a second device, according to an embodiment of the present invention.

FIG. 6 is a flowchart illustrating a technique for the first server 210 to process the registration of the second device 240 according to an embodiment of the present invention. The first server 210 provides a catalog service. A control unit of the first server 210 receives a registration request including the ID information of the second device 240 from the first device 230, in operation 602. A determination as to whether the second device 240 has been registered is made with reference to the received ID information, in operation 604. If the second device 240 has not yet been registered, the second device 240 is registered. The ID information of the second device 240 may be stored after being correlated with account information about the user of the first device 230 logged in.

Figure 7:
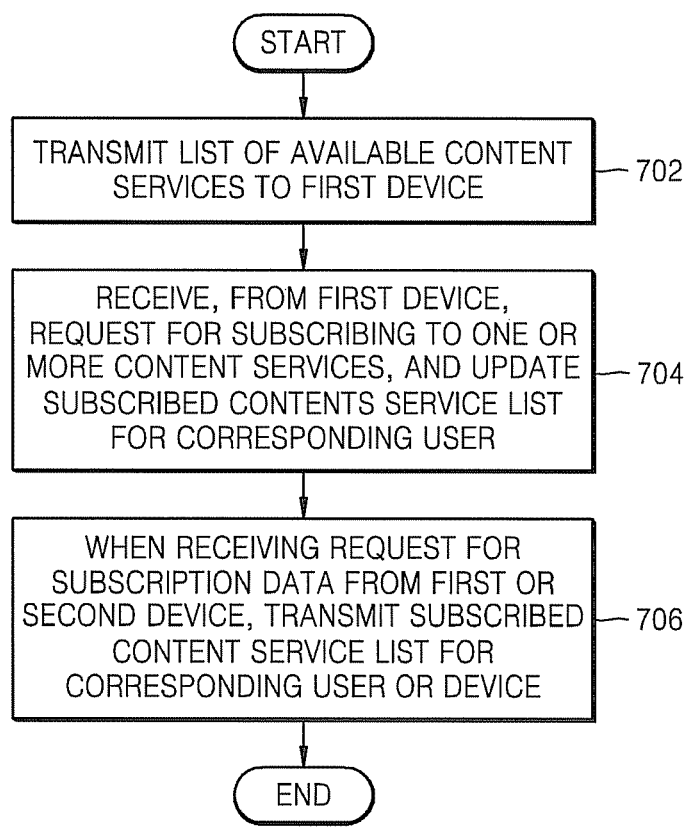
FIG. 7 is a flowchart illustrating a method for a first server to provide a catalog service, according to an embodiment of the present invention.

FIG. 7 is a flowchart illustrating a technique for the first server 210 to provide a catalog service according to an embodiment of the present invention. In operation 702, the first server 210 transmits a list of available content services to the first device 230 upon connection of the first device 230 to the first server 210 so that a user can browse the list and select a content service to subscribe to. When a user login from the first device 230 is completed and the first server 210 receives a request to subscribe to at least one content service, the first server 210 updates a subscribed content service list for the user stored as the service subscription data 213 according to the request, in operation 704. In operation 706, when the first server 210 receives a request for subscription information including ID information, such as user information or device information, or receives a log-in request from the first device 230 or the second device 240, the first server 210 authenticates the user or the device, searches for a subscribed contents service list corresponding to the user or device, and transmits the found list to the device that requested the subscription information or log-in.

According to aspects of the present invention as described above, the subscription of content services, such as a channel service that provides each user with different information according to subscription information, can be managed at any time and at any place without being dependent on a specific PC or a specific PC program. Even while moving without being connected to a PC, a mobile device can automatically update content.

The techniques for using a content service according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc., including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of using a content service in a first user device, the method comprising:
    detecting that a second user device is connected to the first user device in order to use content services;
    transmitting, to a server which maintains information on at least one content service selected by a user and provides updated information on the at least one content service with one or more devices, a registration request for the second user device in order to register the second user device with the server, in response to detecting of a connection of the second user device to the first user device;
    receiving, from the server, the updated information on the at least one content service selected by the user; and
    synchronizing information on at least one content service of the second user device with the received updated information,
    wherein the updated information on the at least one content service which is synchronized in the second user device is used for the second device to receive the at least one content service corresponding to the updated information from a content providing server.

2. The method of claim 1, wherein the synchronizing comprises:

updating information on at least one content service of the first user device using the received updated information; and transmitting the received updated information to the second user device.

3. A method of providing a catalog service in a server, the method comprising:
receiving, from a first user device, a registration request for a second user device connected to the first user device in order to register the second user device with the server, the first user device transmitting the registration request in response to detecting of a connection of the second user device to the first user device;
storing information about the second user device in association with user account data for the first user device so as to register the second user device;
storing updated information on at least one content service selected by a user; and
transmitting the updated information on the at least one content service to the first user device or the second user device,
wherein the updated information on the at least one content service which is received in the second user device through the first user device from the server, is used for the second user device to receive the at least one content service corresponding to the updated information from a content providing server.

4. A first user device to use a content service, the first user device comprising:
a communication unit;
a storage unit configured to store information on at least one content service selected by a user; and
a processor configured to:
detect that a second user device is connected to the first user device in order to use content services,
transmit a registration request for a second user device to a server which maintains the information on at least one content service selected by the user and provides updated information on the at least one content service with one or more devices, in order to register the second user device with the server, in response to the detecting of the connection of the second user device to the first user device,
receive from the server the updated information on the at least one content service selected by the user, and
synchronize information on at least one content service of the second user device with the received updated information,
wherein the updated information on the at least one content service which is synchronized in the second user device is used for the second user device to receive the at least one content service corresponding to the updated information from a content providing server.

5. The first user device of claim 4, wherein the processor is further configured to update the information on at least one content service of the storage unit using the received updated information and transmits the received latest information to the second user device.

6. A server to provide a catalog service, the server comprising:
a communication unit;
a storage unit configured to store information about available content services, user account data for users, and updated information on at least one content service selected by a user; and
a processor configured to:
store identification information about a second user device in association with user account data for a first user device for registering the second user device when receiving, from the first user device, a registration request for the second user device in order to register the second user device connected to the first user device with the server, the first user device transmitting the registration request in response to detecting of a connection of the second user device to the first user device, and
transmit the updated information on the at least one content service to the first user device or the second user device,
wherein the updated information on the at least one content service which is received in the second user device through the first user device from the server, is used for the second user device to receive the at least one content service corresponding to the updated information from a content providing server.

7. A network comprising:
a server configured to:
store information on available content services, user account data for users, and updated information on at least one content service selected by a user, and
transmit the updated information on the at least one content service to a first user device or a second user device;
the first user device configured to:
detect that the second user device is connected to the first user device in order to use content services,
register the second user device with the server in response to the detection of the connection of the second user device to the first user device,
receive from the server the updated information, and to synchronize information on at least one content service of the second user device with the received updated information; and
the second user device configured to synchronize the information on at least one content service of the second user device with the updated information received from the first user device or the server,
wherein the updated information on the at least one content service which is synchronized in the second user device is used for the second user device to receive the at least one content service corresponding to the updated information from a content providing server.

8. A user device to use a content service, comprising:
a communication unit;
a storage unit; and
processor configured to:
receive from another user device or a server updated information on at least one content service selected by a user, the server maintaining information on at least one content service selected by the user and providing updated information, the other user device transmitting a registration request for the user device to the server in order to register the user device with the server, in response to detecting of a connection of the user device to the other user device, and
store the received updated information in the storage unit,
wherein the updated information on the at least one content service is used for the second user device to receive the at least one content service corresponding to the updated information from a content providing server.

9. The user device of claim 8, wherein the processor is further configured to transmit to the server a request for the updated information on at least one content service selected by the user and synchronizing the updated information of the storage unit with the updated information received from the server.

10. A method of using a content service in a second user device, the method comprising:
receiving from a first user device or a server updated information on at least one content service selected by a user, the server maintaining information on at least one content service selected by the user and providing updated information on the at least one content service with one or more devices, the first user device transmitting a registration request for the second user device to the server, in order to register the second user device with the server, in response to detecting of a connection of the second user device to the first user device; and
storing the received updated information in a storage unit of the second user device,
wherein the updated information on the at least one content service is used for the second user device to receive the at least one content service corresponding to the updated information from a content providing server.

11. The method of claim 10, further comprising:
transmitting to the server a request for the updated information on at least one content service selected by the user; and
synchronizing the updated information of the storage unit with the updated information received from the server.

* * * * *